United States Patent [19]

Johnson et al.

[11] 4,268,375

[45] May 19, 1981

[54] SEQUENTIAL THERMAL CRACKING PROCESS

[76] Inventors: Axel R. Johnson, 657 Benjamin Rd., North Babylon, N.Y. 11703; Herman N. Woebcke, 41 Quaker Riadge Rd., Stamford, Conn. 06903

[21] Appl. No.: 82,049

[22] Filed: Oct. 5, 1979

[51] Int. Cl.³ .................. C10G 9/16; C10G 9/30
[52] U.S. Cl. .................. 208/72; 208/48 Q; 208/75; 208/77; 585/330; 585/650
[58] Field of Search .......... 208/72, 67, 106, 53–54, 208/77, 48 Q, 125–132; 585/330, 550

[56] References Cited

U.S. PATENT DOCUMENTS

| | | | |
|---|---|---|---|
| 3,487,121 | 12/1969 | Hallee | 585/652 |
| 3,676,519 | 7/1972 | Dorn et al. | 208/48 Q |
| 3,842,122 | 10/1974 | Wolk et al. | 208/48 Q |
| 3,878,088 | 4/1975 | Nahas et al. | 208/50 |
| 3,907,661 | 9/1975 | Gwyn et al. | 208/48 Q |
| 4,021,501 | 5/1977 | Dyer et al. | 208/48 Q |

Primary Examiner—Delbert E. Gantz
Assistant Examiner—G. E. Schmitkons
Attorney, Agent, or Firm—Morgan, Finnegan, Pine, Foley & Lee

[57] ABSTRACT

A process and system for sequentially cracking hydrocarbon. A first hydrocarbon feed is cracked at high severity low residence times and the cracked effluent is quenched by a second hydrocarbon feed which is coincidentally cracked at low severity.

13 Claims, 1 Drawing Figure

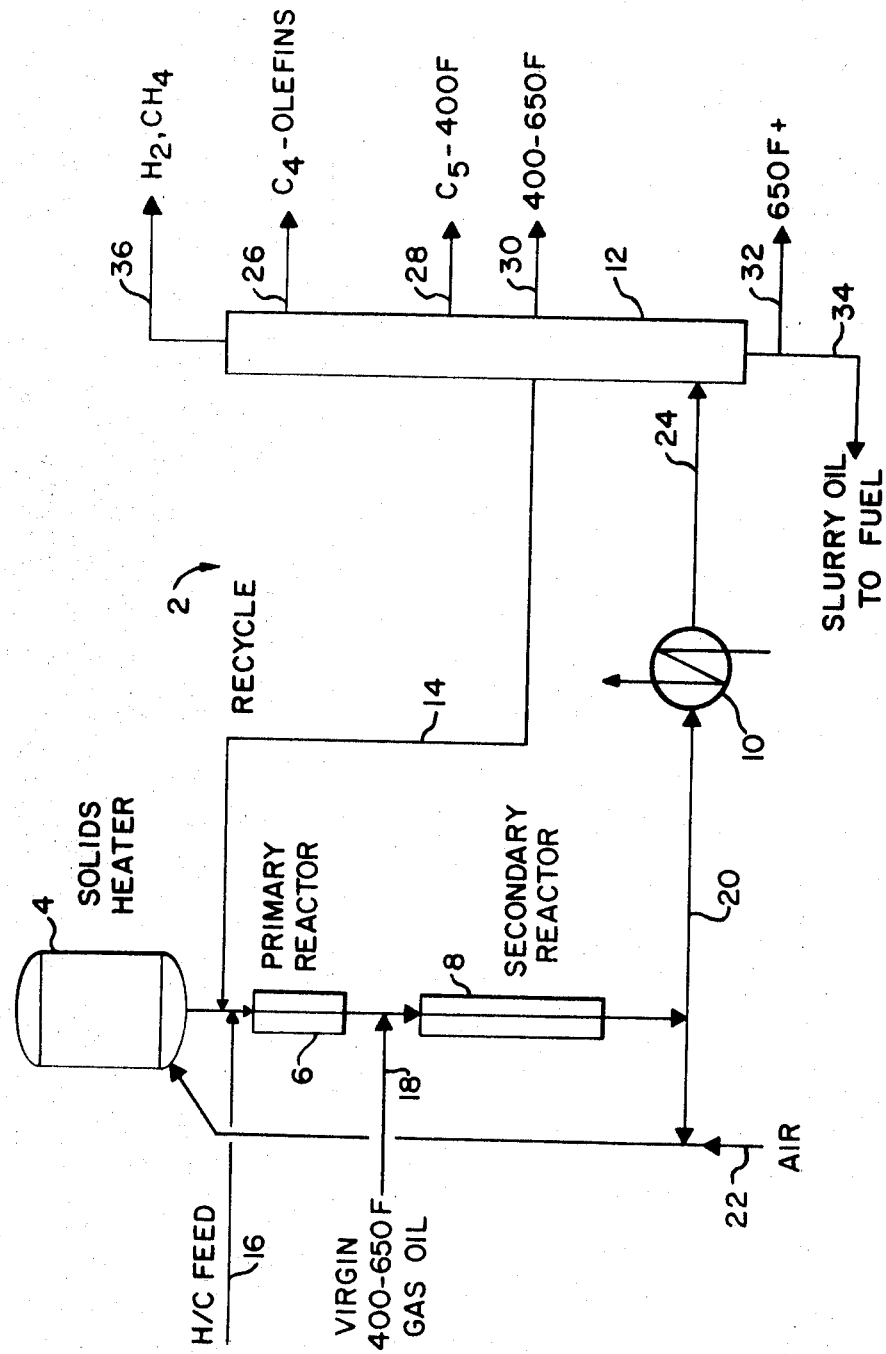

SEQUENTIAL THERMAL CRACKING PROCESS

BACKGROUND OF THE INVENTION

1. Field of the Invention

This invention relates to thermal cracking of hydrocarbon. More specifically, the invention relates to a process and system for quenching cracked effluent with hydrocarbon feed and cracking the hydrocarbon quench material.

2. Description of the Prior Art

At present several processes exist for thermally cracking hydrocarbons to produce olefins. In one process fired heaters are used to provide the requisite heat for reaction. The reactant flows through a plurality of coils within the fired heater, the coils being arranged in a manner that maximizes the rate of heat transfer to the hydrocarbon flowing therethrough. An example of a conventional process is shown by U.S. Pat. No. 3,487,121 (Hallee). In another process heated solids are mixed with the hydrocarbon feed in a reactor. Regardless of the process used, cracked effluent must be rapidly quenched to remove excess heat thereby terminating the cracking reactions. Both direct and indirect quench have been used to terminate the reaction. An example of a device to quench cracked effluent is U.S. Pat. No. 3,910,347 (Woebcke).

It is well known that in the process of cracking hydrocarbon the reaction temperature and reaction residence time are the two primary variables affecting severity, conversion and selectivity. Severity is related to the intensity of the cracking reactions, conversion is defined as the percent of feed transformed into a product, and selectivity is the degree to which the converted products constitute ethylene. Selectivity is generally measured as a ratio of ethylene to methane in the product gas effluent.

At low severity, selectivity is high, but because conversion is low, it is uneconomical to utilize low severity operation. Low severity operation is conducted generally at temperatures between 1200° and 1400° F. and residence times between 200 and 1000 milliseconds. High severity and, hence, high conversion may be achieved at temperatures between 1500° and 2000° F. However, selectivity is poor unless the high severity reaction can be performed at residence times below 200 milliseconds, usually between 20 and 100 milliseconds. At these very low residence times selectivities between 2.5 and 4.0 pounds of ethylene per pound of methane can be achieved, and conversion is generally over 95% by weight of feed. High severity operation, although preferred, has not been employed widely in the industry because of the physical limitations of conventional fired heater reactors. One of the limitations is the inability to remove heat from the product effluent within the allowable residence time parameter. For this reason most conventional systems operate at conditions of moderate severity, temperatures being between 1350° and 1550° F. and residence times being between 200 and 500 milliseconds. Although conversion is higher than at the low severity operation, selectivity is low, being about two pounds of ethylene per pound of methane. But because conversion is higher, the actual yield of ethylene is greater than obtained in low severity operation.

By using short residence time at high severity conditions it is possible to achieve selectivities of about 3:1 or greater. A number of processes have been developed which offer high severity thermal cracking. For example, furnaces have been developed which contain a large number of small tubes wherein the outlet of each tube is connected directly to an individual indirect quench boiler. This process has the disadvantage of being capital intensive in that the quench boiler is not common to a plurality of furnace tube outlets. Further, the high temperature waste heat must be used to generate low temperature, high pressure steam which is not desirable from a thermal efficiency viewpoint. Finally, high flue gas temperatures must be reduced by generation of steam in the convection section of the heater, again limiting the flexibility of the process.

SUMMARY OF INVENTION

It is an object of this invention to provide a process that thermally cracks a first hydrocarbon feedstock at high severity and short residence times to produce improved yields of olefinic compounds, particularly ethylene, and to quench said reaction products with a second hydrocarbon feedstock, which is coincidentally thermally cracked at low severity in the presence of the high severity reaction products to produce additional yields of olefinic compounds at high selectivity.

It is an additional object of this invention to sequentially crack a first hydrocarbon feedstock and a second hydrocarbon feedstock in a manner that enhances ethylene yield.

It is another object of this invention to improve the thermal efficiency of processes wherein hydrocarbon feedstocks are thermally cracked to produce olefins.

These and additional objects will become apparent from the description of the process which follows.

A first hydrocarbon feedstock is introduced to a cracking reactor in the section of the reactor identified as the primary reactor. The primary reactor is operated at conditions of high severity and short residence times. Typical feedstocks suitable for introduction to the primary reactor include light hydrocarbon gases, light gas oil petroleum fractions and heavy gas oil petroleum fractions. The operating conditions of the primary reactor are at about 1600°–2000° F. and at about 10–100 psig with a residence time for the hydrocarbons of between 20 to 150 milliseconds. At these conditions the conversion of hydrocarbons to products is over 95% by weight of the feed, while selectivity is approximately 2.5 to 4 pounds of ethylene per pound of methane.

A second hydrocarbon feedstock which is preferably virgin gas oil 400°–650° F. is introduced to the reactor in a zone identified as the secondary reactor to quench the reaction products of the first feedstock by direct heat transfer. By adding the second feedstock, the temperature of the combined streams of the cracked gas from the primary reactor and the second feed is reduced to below 1500° F., and the high severity reactions are essentially terminated. The secondary reactor is operated at low severity conditions, thus, the second feedstock is also thermally cracked therein. Processing conditions in the low severity reaction zone are temperatures between 1200° to 1500° F., and pressures between 10–100 psig. Reaction residence times are between about 150 to 2000 milliseconds, preferably between 250 and 500 milliseconds.

DESCRIPTION OF DRAWING

A schematic diagram of the process and system is shown in the FIGURE.

DESCRIPTION OF THE PREFERRED EMBODIMENT

The process and system in which the sequential cracking of the subject invention is illustrated is shown in the FIGURE in the environment of a thermal regeneration cracking reactor (TRC). However, as has been indicated, the process and system for effecting sequential cracking is also applicable to conventional cracking systems.

In the sequential cracking process 2 shown in the FIGURE, the system includes a solids heater 4, a primary reactor 6, a secondary reactor 8 and downstream equipment.

The downstream equipment is comprised essentially of an indirect heat exchanger 10, a fractionation tower 12 and a recycle line 14 from the fractionation tower 12 to the entry of the primary reactor 6.

The system also includes a first hydrocarbon feed line 16, a second hydrocarbon feed-quench line 18, a transfer line 20 and an air delivery line 22.

The first hydrocarbon feed stream is introduced into the primary reactor 6 and contacted with heated solids from the solids heater 4. The first or primary reactor 6 in which the first feed is cracked is at high severity conditions. The hydrocarbon feed, from line 16, may be any hydrocarbon gas or hydrocarbon liquid in the vaporized state which has been used heretofore as a feed to a conventional thermal cracking process. Thus, the feed introduced into the primary reactor 6 may be selected from the group consisting of low molecular weight hydrocarbon gases such as ethane, propane, and butane, light hydrocarbon liquids such as pentane, hexane, heptane and octane, low boiling point gas oils such as naphtha having a boiling range between 350° to 650° F., high boiling point gas oils having a boiling range between 650° to 950° F. and compatible combinations of same. These constituents may be introduced as fresh feed or as recycle streams through the line 14 from downstream purification facilities e.g., fractionation tower 12. Dilution steam may also be delivered with the hydrocarbon through lines 16 and 14. The use of dilution steam reduces the partial pressure, improves cracking selectivity and also lessens the tendency of high boiling aromatic components to form coke.

The preferred primary feedstock for the high severity reaction is a light hydrocarbon material selected from the group consisting of low molecular weight, hydrocarbon gases, light hydrocarbon liquids, light gas oils boiling between 350° and 650° F., and combinations of same. These feedstocks offer the greatest increase improvement in selectivity at high severity and short residence times.

The hydrocarbon feed to the first reaction zone is preferably pre-heated to a temperature of between 600° to 1200° F. before introduction thereto. The inlet pressure in the line 16 is 10 to 100 psig. The feed should be a gas or gasified liquid. The feed increases rapidly in temperature reaching thermal equilibrium with the solids in about 5 milliseconds. As mixing of the hydrocarbon with the heated solid occurs, the final temperature in the primary reactor reaches about 1600° to 2000° F. At these temperatures a high severity thermal cracking reaction takes place. The residence time maintained within the primary reactor is about 50 milliseconds, preferably between 20 and 150 milliseconds, to ensure a high conversion at high selectivity. Typically, the KSF (Kinetic Severity Function) is about 3.5 (97% conversion of n-pentane). Reaction products of this reaction are olefins, primarily ethylene with lesser amounts of propylene and butadiene, hydrogen, methane, $C_4$ hydrocarbons, distillates such as gasoline and gas oils, heavy fuel oils, coke and an acid gas. Other products may be present in lesser quantities. Feed conversion in this first reaction zone is about between 95 to 100% by weight of feed, and the yield of ethylene for liquid feedstocks is about 25 to 45% by weight of the feed, with selectivities of about 2.5 to 4 pounds of ethylene per pound of methane.

A second feed is introduced through the line 18 and combines with the cracked gas from the primary reactor 6 between the primary reactor 6 and the secondary reactor 8. The combined stream comprising the second unreacted feed, and the first reacted feed passes through the secondary reactor 8 under low severity reaction conditions. The second feed introduced through the line 18 is preferably virgin feed stock but may also be comprised of the hydrocarbons previously mentioned, including recycle streams containing low molecular weight hydrocarbon gases, light hydrocarbon liquids, low boiling point, light compatible gas oils, high boiling point gas oils, and combinations of same.

Supplemental dilution steam may be added with the secondary hydrocarbon stream entering through stream 18. However, in most instances the amount of steam initially delivered to the primary reactor 16 will be sufficient to achieve the requisite partial pressure reduction in the reactors 6 and 8. It should be understood that the recycle stream 14 is illustrative, and not specific to a particular recycle constituent.

The hydrocarbon feed delivered through the line 18 is preferably virgin gas oil 400°–650° F. The second feed is preheated to between 600° to 1200° F., and upon entry into the secondary reactor 8 quenches the reaction products from the primary reactor to below 1500° F. It has been found that in general 100 pounds of hydrocarbon delivered through the line 18 will quench 60 pounds of effluent from the primary reactor 6. At this temperature level, the cracking reactions of the first feed are essentially terminated. However, coincident with the quenching of the effluent from the primary reactor, the secondary feed entering through line 18 is thermally cracked at this temperature (1500° to 1200° F.) and pressures of 10 to 100 psig at low severity by providing a residence time in the secondary reactor between 150 and 2000 milliseconds, preferably between 250 to 500 milliseconds. Typically, the KSF cracking severity in the secondary reactor is about 0.5 at 300 to 400 milliseconds.

The inlet pressure of the second feed in line 18 is between 10 and 100 psig, as is the pressure of the first feed. Reaction products from the low severity reaction zone comprise ethylene with lesser amounts of propylene and butadiene, hydrogen, methane, $C_4$ hydrocarbons, petroleum distillates and gas oils, heavy fuel oils, coke and an acid gas. Minor amounts of other products may also be produced. Feed conversion in this second reaction zone is about 30 to 80% by weight of feed, and the yield of ethylene is about 8 to 20% by weight of feed, with selectivities of 2.5 to 4.0 pounds of ethylene per pound of methane.

Although the products from the high severity reaction are combined with the second feed, and pass through the second reaction zone, the low severity conditions in the second reaction zone are insufficient to appreciably alter the product distribution of the primary products from the high severity reaction zone. Some chemical changes will occur, however these reaction products are substantially stabilized by the direct quench provided by the second feed.

The virgin gas oils normally contain aromatic molecules with paraffinic hydrocarbon side chains. For some gas oils the number of carbon atoms associated with such paraffinic side chains will be a large fraction of the total number of carbon atoms in the molecule, or the gas oil will have a low "aromaticity".

In the secondary reactor, these molecules will undergo dealkylation-splitting of the paraffin molecules, leaving a reactive residual methyl aromatic, which will tend to react to form high boilers. The paraffins in the boiling range 400° to 650° F. are separated from the higher boiling aromatics in column 12 and constitute the preferred recycle to the primary reactor.

Other recycle feed stocks can include propylene, butadiene, butenes and the $C_5$-400° F. pyrolysis gasoline.

The total effluent leaves the secondary reactor and is passed through the indirect quench means 10 to generate steam for use within and outside the system. The effluent is then sent to downstream separation facilities 12 via line 24.

The purification facilities 12 employ conventional separation methods used currently in thermal cracking processes. The FIGURE illustrates schematically the products obtained. Hydrogen and methane are taken overhead through the line 36. $C_4$ and lighter olefins, $C_5$-400° F. and 400°-650° F. fractions are removed from the fractionator 12 through lines 26, 28 and 30 respectively. Other light paraffinic gases of ethane and propane are recycled through the line 14 to the high severity primary reactor. The product taken through line 28 consists of liquid hydrocarbons boiling between $C_5$ and 400° F., and is preferably exported although such material may be recycled to the primary reactor 6 if desired. The light gas oil boiling between 400° to 650° F. is the preferred recycle feed, but may be removed through line 30. The heavy gas oil which boils between 650°-950° F. is exported through stream 32, while excess residuim, boiling above 950° F. is removed from the battery limits via stream 34. The heavy gas oil and residuim may also be used as fuel within the system.

In the preferred embodiment of the process, the second feed would be one which is not recommended for high severity operation. Such a feed would be a gas oil boiling above 400° F. which contains a significant amount of high molecular weight aromatic components. Generally, these components have paraffinic side chains which will form olefins under proper conditions. However, even at moderate severity, the dealkylated aromatic rings will polymerize to form coke deposits. By processing the aromatic gas oil feed at low severity, it is possible to dealkylate the rings, but also to prevent subsequent polymerization and coke formation. As a consequence of the low severity, however, the yield of olefins is low, even though selectivity as previously defined is high. Hence, low severity reaction effluents often have significant amounts of light paraffinic gases and paraffinic gas oils. These light gases and paraffinic gas oils are recycled preferably to the high severity section, such compounds being the preferred feeds thereto. The aromatic components of the effluent are removed from the purification facilities 12 as part of the heavy gas oil product, and either recycled for use as fuel within the system, or exported for further purification or storage.

An illustration of the benefits of the process of the invention is set forth below wherein feed cracked and the resultant product obtained under conventional high severity cracking and quenching conditions is compared with the same feed sequentially cracked in accordance with this invention.

| FEED | 400-650° F. Gas Oil | | |
|---|---|---|---|
| PYROLYSIS MODE | Once Thru | Sequential TRC | |
| REACTOR | | 6 | 8 |
| FEED | Virgin | Recycle | Virgin |
| TIME, MILLISEC. | 300 | 20 | 300 |
| KSF | 4.0 | 3.5 | 0.5 |
| WT. % FEED | 100 | 60 | 100 |
| CRACKED PRODUCT | | | |
| FUEL GAS | 14 | | 10 |
| $C_2H_4$ | 22 | | 27 |
| $C_3H_6$ | 8 | | 14 |
| $C_4$-400° F. | 11 | | 13 |
| 400-650° F. | 20 | | 11 |
| 650° F.+ | 25 | | 25 |
| | 100 | | 100 |

On the sequential TRC process, the recycle feed is cracked under high severity conditions in the primary reactor 6 and the virgin feed is introduced through the line 18 to quench the cracked product from the primary reactor 6. Thereafter, the virgin feed is cracked under low severity conditions in the secondary reactor 8.

What is claimed is:

1. A process for cracking hydrocarbon feed to produce olefins comprising:
   a. delivering hydrocarbon feed to a first zone;
   b. thermally cracking the hydrocarbons in the first zone at temperatures above 1,500° F.;
   c. discharging the cracked effluent from the first zone to a second zone;
   d. delivering a second hydrocarbon feed to the entry of the second zone; and
   e. mixing the cracked effluent from the first zone and the second hydrocarbon feed in the second zone; whereby the cracked effluent from the first zone is quenched and the second hydrocarbon feed is cracked at low severity in the second zone at a residence time of the hydrocarbon between 150 and 2,000 milliseconds, a hydrocarbon temperature of 1,200° to 1,500° F. and a pressure of 10 to 100 psig.

2. A process as in claim 1 further comprising the steps of passing the composite quenched effluent from the second zone through the hot side of an indirect heat exchanger and passing steam through the cold side of the indirect heat exchanger.

3. A process as in claim 1 further comprising the steps of fractionating the cracked effluent and returning a portion of the fractionated cracked effluent to the first zone.

4. A process as in claim 1 wherein the first zone is operated at high severity short residence cracking conditions.

5. A process as in claim 1 wherein the feedstock delivered to the first zone is selected from the group consisting of low molecular weight hydrocarbon gases, light hydrocarbon liquids, light gas oils boiling between 350° and 650° F., and combinations of said hydrocarbons.

6. A process as in claim 1 wherein the feed delivered to the second zone is virgin gas oil 400° to 650° F.

7. A process as in claim 3 wherein the fraction returned to the first zone is light paraffinic gases of ethane and propane.

8. A process as in claim 1 wherein the hydrocarbon delivered to the first zone is pre-heated to a temperature between 600° and 1,200° F.

9. A process as in claim 1 wherein the hydrocarbon delivered to the second zone is pre-heated to a temperature between 600° and 1,200° F.

10. A process as in claim 4 wherein the reaction conditions in the first zone are a residence time of 20 to 150 milliseconds, a hydrocarbon temperature of 1,600° to 2,000° F. and a pressure of 10 to 100 psia.

11. A process as in claim 10 wherein the kinetic severity function in the first zone is about 3.5.

12. A process as in claim 1 wherein 100 pounds of hydrocarbon are delivered to the second reaction zone as quench for every 60 pounds of effluent from the primary zone.

13. A process as in claim 1 wherein the kinetic severity factor in the second zone is about 0.5 at about 300 to 400 milliseconds.

* * * * *